United States Patent [19]

Clifford et al.

[11] 3,999,382

[45] Dec. 28, 1976

[54] ROCKET MOTORS

[76] Inventors: David Victor Clifford; William George Williams, both, c/o The Ministry of Aviation, London; Stuart Gordon, 10 Furlongs Road, Cleobury Mortimer, Shropshire; Kenneth Gordon Reed, 15 Willow Lane, Appleton, Warrington, all of England

[22] Filed: Oct. 26, 1966

[21] Appl. No.: 591,037

[52] U.S. Cl. .................. 60/253; 264/3 C; 102/103

[51] Int. Cl.² .......................... F02K 9/04

[58] Field of Search .............. 60/253, 255, 219; 264/3; 86/1; 102/103

[56] References Cited

UNITED STATES PATENTS 3,116,597  1/1964  Preckel ................. 60/253

*Primary Examiner*—Samuel Feinberg
*Attorney, Agent, or Firm*—Cushman, Darby & Cushman

EXEMPLARY CLAIM

1. A case-bonded solid propellant rocket motor having a motor case, the motor case having an inner surface, a double-base propellant located in the motor case, the double-base propellant having an outer surface, and a layer of a polyvinyl acetal resin bonded to the outer surface of the double-base propellant to bond the propellant to the inner surface of the motor case.

9 Claims, No Drawings

ROCKET MOTORS

This invention relates to case-bonded solid propellant rocket motors and methods of their manufacture.

Solid propellant rocket motors fall into two general categories: cartridge loaded and case-bonded.

In a cartridge loaded motor, the propellant mass, or grain, is loaded into a hollow motor case, cartridge fashion, the grain usually being inhibited on its outer surfaces to prevent combustion on them, and is restrained from longitudinal movement within the case by heavy locating rings.

On the other hand, in a case-bonded motor, the propellant mass is formed within the motor case and bonded to the case wall, enabling the entire cross-section of the case to be occupied by propellant, since the case itself may be made to function as an inhibitor. Thus, it will be seen that a case-bonded rocket motor has a higher loading density than a cartridge-loaded motor, since a higher proportion of the volume of the case may be occupied by propellant, and the propellant locating rings and inhibitor may be dispensed with, resulting in a saving in dead weight. Thermal insulation is provided by the propellant itself, which protects the chamber wall up to the end of combustion, except at the end closures and the burn-back distances of either end, which are exposed as the propellant is consumed, and any other areas which may be exposed during the course of combustion and which are predictably dependent upon the propellant grain geometry and burning pattern. Case bonding also permits the use of motor cases with "bottled in" ends, which considerably reduce the weight of the heavy end rings and their attachments.

However, although case-bonded rocket motors hitherto available are satisfactory for long range strategical use, where the rocket installation is maintained under carefully controlled conditions of temperature and humidity, in contrast they have proved unsuitable for tactical military use, where the rocket motor is liable to be exposed to temperatures at which the bond between the propellant and case might be weakened or ruptured, leading to uncontrolled functioning of the rocket motor on firing. The reasons for bond failure may be three-fold. Firstly, the differential thermal expansion coefficients of propellant and case cause stresses to be set up in the bond on temperature cycling; secondly, prolonged exposure to elevated temperatures may weaken the bond by thermal degradation or by migration of materials, such as plasticisers, from the propellant into the bond; and thirdly, prolonged exposure to cold conditions may lead to stress and embrittlement of the bond.

It is an object of the present invention to provide a case-bonded rocket motor in which the bond between case and propellant is capable of withstanding storage over a wider range of humidity and temperature than has hitherto been possible.

According to one aspect of the invention, a case-bonded solid propellant rocket motor comprises a double-base propellant, the outer surface of which has a layer of a polyvinyl acetal resin bonded thereto to bond the propellant to the inner surface of the motor case. Polyvinyl formal has been found to be especially useful for this purpose.

According to a further aspect of the invention, a method of forming a bond between the propellant and the case of a case-bonded solid propellant, comprises providing a layer of polyvinyl acetal resin on the inner surface of the rocket motor case, curing the said layer and casting a double-base propellant into the case and within the layer so that the cast propellant is bonded to the polyvinyl acetal coating.

The term "inner surface" of the motor case, is intended to include the inner surface of a lined or unlined rocket motor case. Thus, it may be the internal surface of either the material of the case itself, e.g. steel or fibre-reinforced plastics, or of a heat insulating lining material, such as a heat-resistant elastomer, bonded to the inner wall of the case.

The term "double-base propellant" is intended to include nitrocellulose with nitroglycerine or other liquid nitric ester, with or without other additives, e.g. ammonium perchlorate, organic binders and fuels, such as aluminium powder.

Preferably, a layer of another resin is provided between the acetal layer and the said inner surface, the other resin being chosen for its compatibility with both the acetal layer and the material of the inner surface. Examples of suitable resins include epoxy, polyester and formaldehyde resins; but phenol-formaldehyde resin is particularly suitable when the acetal layer consists of polyvinyl formal. Both the polyvinyl acetal resin and the other resin are cured in situ before the propellant is cast into the case.

The double resin layer may be formed on the inner surface of the motor case in a variety of ways which have equal merit as regards bond characteristics, but which provide alternative methods of application. The final choice of method will normally be determined by the location and physical characteristics of the surface to which the resin layer is to be applied.

In one method of applying the double resin layer, the inner surface of the motor case is firstly coated with a solution of the other resin and is secondly coated with a solution of the polyvinyl acetal resin after drying the coating of the other resin.

In a second method of applying the double resin layer, the other resin is a phenol-formaldehyde resin solution and the inner surface is coated with a layer of said solution, the polyvinyl acetal resin in powder form being rolled on to the surface of the layer.

Three typical alternative methods of applying the double layer resin are illustrated below by reference to specific resin materials:

1. Duplex Film System

A phenol-formaldehyde resin layer is laid down on a thin carrier foil, e.g. of polyethylene, and a polyvinyl acetal powder applied to it to form a foil-supported duplex film. When the resin layer has been consolidated by heating and passage between rollers, the carrier foil may be stripped off, exposing the duplex film of phenol-formaldehyde and polyvinyl acetal. The duplex film, which handles rather like tissue-paper, may be laid up on the inner surfaces of the motor, with the acetal layer located inwardly of the phenol-formaldehyde layer. The proportions of phenol-formaldehyde and polyvinyl acetal may conveniently be varied between 1/1 and 1/4, although proportions outside this range may be used if occasion demands. Because of the fragility of the film, it is not advisable to apply it directly to the bare metal of a motor case, but if such parts are lined with a thin film of a heat-resisting elastomer, such as a chlorinated polyethylene, the duplex film may be applied to them.

2. Lacquer Coating System

This entails successively coating the inner surface of the motor case with two solutions, the first solution containing phenol-formaldehyde and the second containing polyvinyl acetal, the first coating being air-dried before applying the second. In a preferred method, the first solution contains both phenol-formaldehyde and acetal. The coating may be accomplished by spraying or dip coating, the viscosity of the solutions being adjusted to suit the particular method used. Dip coating is ideal if a support member has to be coated on both sides.

3. Powder Embedment System

The inner surface of the motor case is coated with a phenol-formaldehyde solution and the tacky coated surface is roll coated with polyvinyl acetal powder. This virtually comprises forming a duplex film in situ, so that the difficulties associated with handling such a film are avoided.

When the surface of the motor case has been coated with a double resin layer, the layer is cured before the propellant is cast in the case. The exact conditions of curing will depend upon the nature of the resin used, but best results are obtained by curing at elevated temperature under pressure. The propellant may be cast into the coated motor case by any suitable technique, several of which are well-known in the art.

Stresses are set up in known solid propellant casebonded rocket motors which are intensified the greater the difference between the curing temperature of the propellant and the temperature of exposure of the rocket motor, because of the different thermal expansion characteristics of double-base propellant and rocket motor case materials. Further, as the temperature of the propellant itself falls, so its elongation falls and its modulus increases, rendering it less able to accommodate such stressing. Eventually failure of the propellant or bond system may occur.

Such stresses have usually been accommodated by the provision of stress relief devices in the motor design. These devices operate on a bellows or flap principle, relatively movable parts of each bellows or flap being secured to two component parts of the motor and/or propellant between which stress is liable to develop, thus allowing the stresses generated by thermal cycling to be dissipated by permissible movement of the movable parts of the device. Stress relief devices may conveniently be formed from flexible combustion inhibiting material, such as "Hypalon", bonded to the propellant or the motor case as the situation demands by the techniques previously described. The two separable sections of the stress relief device may be bonded together directly at one end and either left free to separate at the other end or bonded by means of a flexible bellows arrangement.

Stress relief devices are preferably incorporated in motors according to the present invention in order to obtain the maximum benefit the proposed bonding system.

In order that the invention may be more fully understood, it will now be illustrated by the following specific Examples, which firstly describe the application of a heat insulating lining material to the internal surface of the motor case itself, the inner surface thus being provided by the lining material.

EXAMPLE 1

A steel rocket motor case was degreased in trichlorethylene vapour bath and the inner surface of the degreased case shot-blasted to provide a uniform, clean, matt finish, with the minimum removal of metal.

The cleaned motor case was again vapour degreased and its open ends sealed against ingress of moisture or other contaminants. Within 8 hours of shot-blasting, the inner surface of the motor case was sprayed with an ethanolic solution of a phenol-formaldehyde resin to form a resin layer 0.0005 to 0.001 inch thick, and the layer was dried tack-free by oven drying. The oven temperature should not exceed 60° C and the drying period should be from 12 to 24 hours. The resin may also be applied in a solution or suspension in other solvents, such as ethylene dichloride, chloroform and dioxane. Suitable commercially available resin solutions or suspensions are "Redux" 775 and "Redux" 120 ("Redux" is a Trade Mark of Bonded Structures Limited).

A thermal insulation material was laid up on part of the prepared inner surface of the motor case. In this example, a chlorinated sulphonated polyethylene manufactured by E. I. du Pont de Nemours & Co. under the Trade Mark "Hypalon", modified by filling with inorganic compounds such as antimony and lead oxides and silica, was used in sheet form, but other modified polyethylenes or ethylene/propylene terpolymers, such as the "Royalenes" (Trade Mark) manufactured by the U.S. Rubber Co., may be used. These materials are normally elastomers which are filled by a range of inorganic materials which confer flame, abrasion and erosion resistant properties, plasticised for improved flexibility and flow properties, and contain vulcanising compounds which provide a cross-linking action on curing.

Sheet insulating material was tailored to fit those parts of the motor case which were required to be insulated, several layers being superimposed until the required thickness had been built up. The edges of the material were butted together and the butt joints successive layers offset and those in the final layer sealed by a thin capping strip of insulating material.

Sheet intended for the first layer of insulating material (elastomer/metal bonds) was wiped with a solvent, e.g. trichlorethane, trichlorethylene or chloroform, and air dried at 50° to 60° C for 30 minutes before being applied to the resin coated case, but sheet intended for successive layers (elastomer/elastomer bonds) was coated with a film of phenol-formaldehyde which was air dried at 50° to 60° C before the material was fitted in place, the time of drying being dependent upon the solvent used for the phenol-formaldehyde, e.g. 10–15 minutes for methylated spirits, and at least 24 hours for ethylene dichloride.

A thin foil of heat-insulating material (0.010 inch thick) was applied to those parts of the motor case which did not need to be insulated, to form a suitable surface on which to apply the duplex film.

The polyethylene backing foil was then stripped from a duplex phenol-formaldehyde/polyvinyl formal resin film prepared in accordance with the procedure previously described, and the film laid up to form a layer on the prepared inner surface to which the propellant was to be bonded. In this instance the duplex film was formed from "Redux" phenol-formaldehyde and "Formvar" (Trade Mark) polyvinyl formal. Before the film was laid up, its phenol-formaldehyde surface was brush coated with methylated spirit to a coverage of about 10 ml/sq.ft. The wetted film was then smoothed into position, avoiding gaps or blisters, joints between adjacent pieces of film being formed by overlapping. The resin coated surface was then dried for 24 hours at 15/25° C.

Clean parting agent (cellulose acetate 0.005 inch thick) was assembled inside the motor tube to cover completely the surfaces prepared for propellant bonding, and a pressure bag, lightly dusted with talc, was fitted into the motor. The bag was inflated to 5lb/sq.in. and the space between the pressure bag and the motor case evacuated for 2 hours, to reduce the pressure in the space to less than 20 mm. mercury. The vacuum attachment was then disconnected and the pressure in the pressure bag increased to 60lb/sq.in. The motor case, with the pressure bag in place, was then placed in a hot air oven at 140°–150° C for 3 hours to cure the resins and vulcanise the thermal insulant. Alternatively, curing could be accomplished by placing the motor tube in a steam autoclave controlled at 70lb/sq.in. (saturated) or 2/2½ hours.

It should be noted that it is possible, by the simultaneous application of heat and pressure, to cause the uncured insulant to flow and mould itself to the contours of the motor case. Similarly, two closely butted faces of insulant sheet will flow together, intermingle and form a continuous smooth joint completely devoid of discontinuities. This is a valuable and important property in the information in situ of an integral thermal insulation liner without gaps, projections, discontinuities or abrupt steps. All of these are disadvantageous in rocket motor operation since they set up local violent turbulence of the gas flow causing in turn much more rapid heat transference into and much more severe erosion of thermal insulation and metal, thus leading to case overheating and rupture.

On completion of cure, the motor case was allowed to cool below 80° C before disassembly. After inspection the lined, resin coated motor case was prepared for propellant casting by lightly degreasing the internal surfaces with methyl ethyl ketone to remove any adventitious contamination, and the inside surface allowed to air dry for 12 hours. The ends of the motor case were then sealed with dust-proof caps pending casting of the propellant.

Double-base propellant was cast into the prepared motor case by removing the dust caps, filling the space to be occupied by the propellant with a granular propellant powder based on nitrocellulose and then displacing the air between the granules with a casting liquid comprising desensitised nitroglycerine. The casting liquid was forced through the mass of granules by connecting one end of the motor case to a reservoir of casting liquid pressurised by nitrogen gas.

When the air had been displaced, the whole mass (nitrocellulose/nitroglycerine) was allowed to solidify and cured at temperatures and for times dependent upon the particular composition and size of motor involved, but, typically at 54° C for 96 hours. The upper surface of the mass was maintained under a slight, positive nitrogen pressure during the curing operation after which the propellant was securely bonded to the resin.

The above casting process is by way of example only; any other suitable process may be used.

EXAMPLE 2

The inner surface of a rocket motor case, degreased and shot-blasted as described in Example 1, was sprayed with a solution of the following composition:

| Solution 1 | Parts by Weight |
| --- | --- |
| Phenol-formaldehyde resin ("Redux" 775 liquid) | 49 |
| Polyvinyl formal resin ("Formvar" 1595.S) | 49 |
| Ethylene dichloride | 840 |
| Cyclohexanone | 315 |

When a layer 0.001 inch to 0.0015 inch thick had been built up, it was allowed to dry until tack-free and a lining of insulating material built up on the coated inner surface as described in Example 1. However, in this instance, the step of applying thin foil to noninsulated parts of the surface, was omitted. Parting agent and a pressure bag were inserted in the motor case and the bag pressure raised to 60lb/sq.in. The pressurised case was then placed in an oven at 90° C for 3 hours as a "tacking cure" to prevent the insulation from moving during subsequent coating operations, without affecting the degree of polymerisation of insulating material.

The inner surface of the lined motor case was activated by wiping with solvent and the surface allowed to dry. The activated surface was then sprayed with a first solution to thickness of 0.00075 inch to 0.00125 inch and the layer applied allowed to dry tack-free.

A second solution, having the following composition:

| Solution 2 | Parts by Weight |
| --- | --- |
| Polyvinyl formal resin ("Formvar" 1595.S) | 47 |
| Ethylene dichloride | 840 |
| Cyclohexanone | 315 | was then sprayed on to the inner surface of the motor case until a layer between 0.002 inch to 0.0025 inch had been built up in about six spray passes, the layer being allowed to air dry after each pass. On completion of the final pass, the coated surface was allowed to dry tack-free and stoved at 60° C for 24 hours.

The resins were then cured, the insulant was vulcanised and propellant cast into the case, as described in Example 1.

EXAMPLE 3

The inner surface of a rocket motor case, prepared, insulated and activated as described in Example 2, was spray coated with a solution of phenol-formaldehyde in methylated spirit. While the coated surface was still tacky, the motor case was rotated about its longitudinal axis, which was inclined to the vertical, and polyvinyl formal powder ("Formvar" 1595.E) poured into the upper end of the case. This caused the tacky surface to become covered with a uniform layer of the powder, the excess powder being removed from the lower end of the case. The coated case was stoved at 60° C for 24 hours.

The resins were then cured, the insulant was vulcanised and propellant cast into the case as described in Example 1.

Case-bonded rocket motors, incorporating stress relief devices, in sizes up to 1,000lb. propellant weight and having diameters up to 19 inches, and lengths up to 10 feet, have been prepared using the methods outlined above and have survived successfully exposures to long term storage under natural ambient, low and high temperature conditions; to temperature cycling between the limits liable to be encountered in military usage ($-40/140°$ F); to continuous hot storage at temperatures of 105, 125 and 140° F followed by temperature cycling between the temperature extremes $-5/105$, $-15/125$ and $-40/140°$ F; to rough usage tests; to high humidity; to applied bending loads whilst firing; and to shock loads, such as might be experienced in transport by road, rail, ship or air, by means of submission to practical excursions and also to test rides over rough paved tracks where shock inputs may be gauged.

Thus it will be appreciated that the bonds obtained between propellant and case are both flexible and resistant to considerable temperature fluctuation.

We claim:

1. A case-bonded solid propellant rocket motor having a motor case, the motor case having an inner surface, a double-base propellant located in the motor case, the double-base propellant having an outer surface, and a layer of a polyvinyl acetal resin bonded to the outer surface of the double-base propellant to bond the propellant to the inner surface of the motor case.

2. A rocket motor as claimed in claim 1, in which another resin compatible with the polyvinyl acetal resin and the material of the inner surface is bonded between the polyvinyl acetal resin layer and the inner surface.

3. A rocket motor as claimed in claim 1, in which the polyvinyl acetal resin is polyvinyl formal.

4. A rocket motor as claimed in claim 2, in which the polyvinyl acetal resin is polyvinyl formal and the second resin is a phenol-formaldehyde resin.

5. A rocket motor as claimed in claim 1, which includes a stress relief device.

6. A method of forming a bond between the propellant and the motor case of a case-bonded solid propellant rocket motor comprising providing a layer of polyvinyl acetal resin on an inner surface of the rocket motor case, curing the said layer and casting a double-base propellant into the case and within the layer so that the cast propellant is bonded to the polyvinyl acetal coating.

7. A method as claimed in claim 6, in which another resin compatible with the polyvinyl acetal resin and the material of the inner surface is applied between the polyvinyl acetal resin layer and the inner surface.

8. A method as claimed in claim 7, in which a solution of the other resin is firstly applied to the inner surface of the motor case and after drying of said other resin solution a solution of polyvinyl acetal resin is applied over said other dried resin.

9. A method as claimed in claim 6, in which a layer of phenol-formaldehyde solution is applied to the inner surface of the motor case and the polyvinyl acetal in powder form is rolled on to the surface of the layer.

* * * * *

UNITED STATES PATENT OFFICE
CERTIFICATE OF CORRECTION

Patent No. 3,999,382           Dated December 28, 1976

Inventor(s) David Victor Clifford, William George Williams, Stuart Gordon and Kenneth Gordon Reed It is certified that error appears in the above-identified patent and that said Letters Patent are hereby corrected as shown below:

In the heading:

After paragraph "[21]" insert the following item:

--[30]   Foreign Application Priority Data
    October 27, 1965 United Kingdom........45504/65--

Signed and Sealed this

Third Day of May 1977

[SEAL]

Attest:

RUTH C. MASON
Attesting Officer

C. MARSHALL DANN
Commissioner of Patents and Trademarks